United States Patent
Kretschmer et al.

(10) Patent No.: US 6,782,246 B1
(45) Date of Patent: Aug. 24, 2004

(54) METHOD FOR PRODUCING A TEST SIGNAL

(75) Inventors: Erhard Kretschmer, Sauerlach (DE); Johann Mieslinger, Landshut (DE); Gregor Kleine, Wolfratshausen (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 380 days.

(21) Appl. No.: 10/048,788

(22) PCT Filed: Sep. 4, 2000

(86) PCT No.: PCT/EP00/08622

§ 371 (c)(1), (2), (4) Date: Feb. 5, 2002

(87) PCT Pub. No.: WO01/28139

PCT Pub. Date: Apr. 19, 2001

(30) Foreign Application Priority Data

Oct. 14, 1999 (DE) .......................... 199 49 632

(51) Int. Cl.[7] ............................................. H04B 17/00
(52) U.S. Cl. ................................ 455/226.3; 455/115.1; 455/116; 455/126; 455/67.4; 324/613; 324/614
(58) Field of Search .................... 455/115.1, 115.2, 455/115.3, 115.4, 116, 126, 67.4, 226.3, 226.4; 324/613, 614

(56) References Cited

U.S. PATENT DOCUMENTS

| 3,875,328 A | * | 4/1975 | Gibson et al. | ............... 348/193 |
| 3,963,992 A | * | 6/1976 | Hekimian et al. | .......... 330/127 |
| 4,300,233 A | | 11/1981 | Gibbs | |
| 4,742,561 A | | 5/1988 | Tipton | |
| 5,465,050 A | | 11/1995 | Marinelli et al. | |
| 5,661,442 A | | 8/1997 | Sparks | |
| 6,018,647 A | * | 1/2000 | Fitzgerald | ................... 455/135 |
| 2002/0154604 A1 | * | 10/2002 | Huhtala | ..................... 370/241 |

FOREIGN PATENT DOCUMENTS

| DE | 197 23 086 A1 | 1/1998 |
| DE | 40 20 084 C2 | 5/1999 |
| EP | 0 314 301 B1 | 3/1995 |

* cited by examiner

Primary Examiner—Lee Nguyen
Assistant Examiner—Minh D. Dao
(74) Attorney, Agent, or Firm—Ditthavong & Carlson, P.C.

(57) ABSTRACT

An apparatus and method are described for producing a test signal with a desired signal-to-noise ratio on a selectable output frequency for measuring a transmission system. A carrier signal, generated from a carrier signal, and a noise signal are remixed with the carrier signal in a bandwidth equal to or smaller than a smallest signal bandwidth of the transmission system. The levels of the carrier signal and the noise signal are adjusted to a predetermined ratio based on a measurement of the remixed carrier signal and the remixed noise signal. The noise signal is attenuated and added to the carrier signal until the desired signal-to-noise ratio is attained.

10 Claims, 1 Drawing Sheet

METHOD FOR PRODUCING A TEST SIGNAL

FIELD OF THE INVENTION

The present invention relates to signal processing and more particularly to a method and an arrangement for producing a test signal with a predetermined signal-to-noise ratio and any selectable output frequency for measuring transmission systems that can be operated with different signal bandwidths.

BACKGROUND OF THE INVENTION

With digital television signals, a variety of modulation formats are used today in the domain of cable, terrestrial and satellite transmission systems. Due to the multiplicity of symbol rates of the digital television signals, these digital television signals have different signal bandwidths. For example, there are transmission systems that can be operated with signal bandwidths of 4 MHz, 6 MHz, 8 MHz or 27 MHz.

For measuring such transmission systems test signals are required, which are given a defined noise level, or, in other words, have a defined signal-to-noise ratio C/N (C=carrier, N=noise) in decibels, and can be placed anywhere in a predetermined frequency range. Such test signals have to date been composed of separately generated modulated carrier signals and noise signals. However, the signal-to-noise ratio calculated from them is encumbered with the errors of the two signals and so measurements with such conventional test signals are imprecise.

There is a need for a simpler method, and one better suited to practice, for generating such test signals and a simple arrangement for carrying out such a method.

SUMMARY OF THE INVENTION

This and other needs are addressed by the present invention, in which a precisely calibrated signal-to-noise (C/N) test signal can be generated on a freely selectable output frequency to a desired signal-to-noise ratio of, for example, 20 dB, by attenuating the noise signal with a simple calibration line. This approach can be implemented with straightforward circuit technology. It is particularly advantageous to calibrate automatically carrier signal and noise signal levels to an equal ratio with a corresponding regulating arrangement, so the calibration is also constantly repeated during operation and any temperature influences or scattering of the carrier signal or of the noise signal are automatically corrected.

It has proved particularly advantageous to generate the carrier signal by modulation of the carrier frequency of a local oscillator and to remix both the carrier signal and the noise signal into the basic band with this same carrier frequency before comparing levels, so, irrespective of the adjusted carrier frequency of the carrier signal, the comparison of the levels and regulation of the levels take place at the constant output frequency of the inverse mixer.

Accordingly, one aspect of the present invention is directed to method for producing a test signal with a desired signal-to-noise ratio on a selectable output frequency for measuring a transmission system. In this method, a carrier signal, generated from a carrier signal, and a noise signal are remixed with the carrier signal in a bandwidth equal to or smaller than a smallest signal bandwidth of the transmission system. The levels of the carrier signal and the noise signal are adjusted to a predetermined ratio (preferably one) based on a measurement of the remixed carrier signal and the remixed noise signal. The noise signal is then attenuated and adding to the carrier signal until the desired signal-to-noise ratio is attained. In one embodiment, the carrier signal and the noise signal are remixed with the carrier signal to an intermediate frequency in the basic band.

Another aspect of the present invention relates to an apparatus for producing a test signal with a desired signal-to-noise ratio on a selectable output frequency for measuring a transmission system. The apparatus includes a first adjustable calibration line for generating a noise signal based on a noise source and a second adjustable calibration line for attenuating the noise signal and adjustable to a desired signal-to-noise ratio. A level detector is provided for receiving the noise signal and a carrier signal via a toggle switch, in which the first calibration line is controlled based on an output of the level detector so that a level of the noise signal is in a predetermined ratio with a level of the carrier signal.

In various embodiments, the apparatus may also include a modulator for generating the carrier signal based on a carrier frequency of a local oscillator, a mixer, supplied with the carrier frequency of the local oscillator, arranged between the toggle switch and the level detector, and/or a fixed frequency band filter coupled before the level detector, in which the band filter has a bandwidth equal to or smaller than a smallest signal bandwidth of the transmission system.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method and apparatus for producing a test signal are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
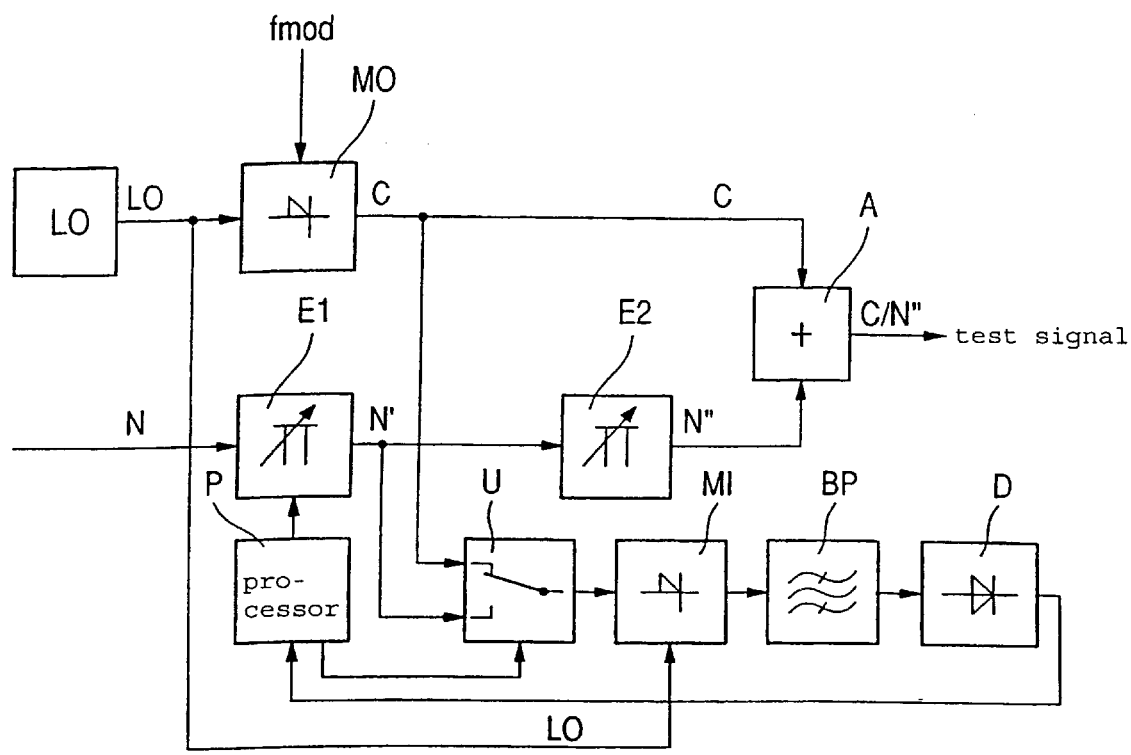
FIG. 1 is a schematic diagram of an embodiment of the present invention.

FIG. 1 shows a basic circuit arrangement for automatically generating a test signal with predetermined signal-to-noise ratio C/N in dB, for use in measuring TV transmission systems that can be operated with different signal bandwidths, for example.

A carrier signal C is generated from a modulator MO based on a carrier frequency output from a local oscillator LO and a modulation signal (fmod). The local oscillator LO can be tuned to any number of carrier frequencies, and the modulator MO can be implemented, for example, as a normal IQ modulator. A noise source (not shown) supplies a noise signal N. In the depicted exemplary embodiment, the noise signal N is applied to an adjustable calibration line E1. A similar calibration line (not shown) can also be provided for the carrier signal C.

Figure 2:
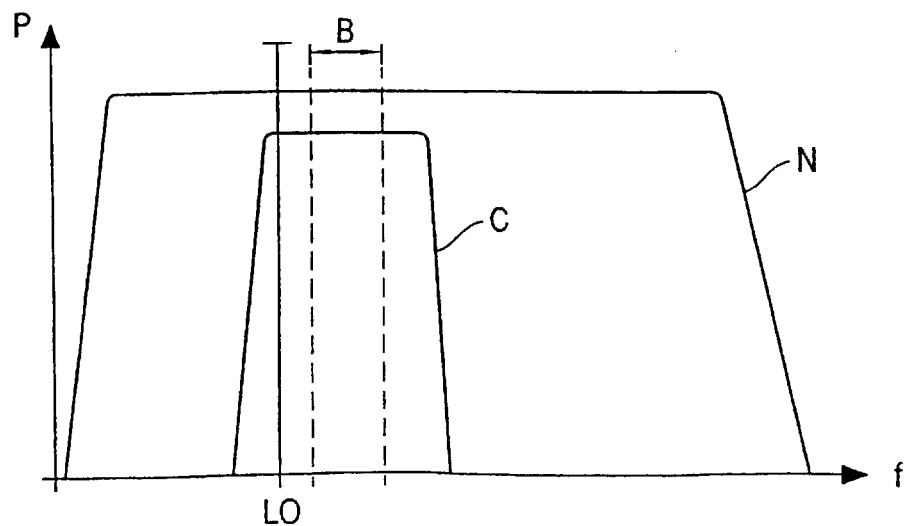
FIG. 2 is a frequency-response diagram for an embodiment of the present invention.

A regulated noise signal N', produced from the adjustable calibration line E1, and the modulated carrier signal C are then supplied to a level detector D via a toggle switch U. The toggle switch U is controlled by a processor P in such a way that the carrier signal C and the noise signal N are alternately supplied to the level detector D via a mixer MI and a band pass filter BP. In the mixer MI, the carrier frequency of the local oscillator LO is supplied, so that both the carrier signal C and the noise signal N' from any frequency position are each inversely mixed, or remixed, with a fixed intermediate frequency, preferably in the basic band. The band pass filter BP may be tuned to a fixed transmission frequency, and its bandwidth B tuned to the smallest operable signal bandwidth of the transmission system. As a result, as shown in FIG. 2, both the noise signal N and the carrier signal C are measured only within this measuring bandwidth B. (During the remixing into the basic band, the carrier frequency LO in FIG. 2 is cancelled out and becomes zero).

The levels of carrier signal C and noise signal N', measured in this way within the bandwidth B, are compared by the processor P, which adjusts the calibration line E1 so that C and N' are in a predetermined ratio to one another. Preferably, this ratio is one (1), so that both levels are therefore equal in size.

The regulated noise signal N' is supplied to a second calibration line E2, which can be attenuated to produce a noise signal N" for a desired signal-to-noise ratio C/N". The noise signal N", attenuated to this desired ratio, is added to the carrier signal C in an adder A. The output signal of the adder A is then the test signal with the predetermined signal-to-noise ratio C/N".

The bandwidth B of the band pass filter BP can preferably be reversed and thus adjusted to the signal bandwidths. In the arrangement of the toggle switch U in front of the adder A, illustrated in FIG. 1, calibration is done automatically during operation without interruption of the generated test signal.

In many cases, however, it can be advantageous to interrupt generating the test signal during calibration, for example, if potential errors of the second calibration line E2 or the adder A are to be detected at the same time by the calibration. In this embodiment, the output signal of the adder A is supplied directly to the input of the inverse mixer M1 and via a selective switch in the carrier signal path C and the noise signal path N alternately only the carrier signal C and only the noise signal N" are supplied to the adder and their levels are then compared in the level detector D, as described above. The calibration line E2 must in this case be adjusted to a dividing ratio of one (1).

Furthermore, it may be advantageous to provide these two operating possibilities simultaneously in one device, to enable calibration during operation or with interruption.

While the present invention has been described in connection with a number of embodiments and implementations, the present invention is not so limited but covers various obvious modifications and equivalent arrangements, which fall within the purview of the appended claims.

What is claimed is:

1. A method for producing a test signal with a desired signal-to-noise ratio on a selectable output frequency for measuring a transmission, said method comprising:

remixing a carrier signal, generated from a carrier frequency, and a noise signal with the carrier frequency in a bandwidth equal to or smaller than a smallest signal bandwidth of the transmission system;

regulating levels of the carrier signal and the noise signal to a predetermined ratio based on a measurement of the remixed carrier signal and the remixed noise signal; and attenuating the noise signal and adding the attenuated noise signal to the carrier signal until the desired signal-to-noise ratio is attained.

2. A method according to claim 1, wherein the predetermined ratio is one (1).

3. A method according to claim 1, wherein said attenuating is performed by means of an adjustable calibration line.

4. A method according to claim 1, further comprising modulating a local carrier signal to generate the carrier signal, wherein the carrier signal and the noise signal are remixed with the local carrier signal to an intermediate frequency in a basic band.

5. A method according to claim 1, wherein said regulating the levels is performed with or without interruption of generation of the test signal.

6. A method according to claim 1, wherein said regulating the levels is performed by regulating the level of the noise signal and/or the level of the carrier signal.

7. A method according to claim 1, wherein said regulating the ratio of the levels is performed automatically.

8. An apparatus for producing a test signal with a desired signal-to-noise ration on a selectable output frequency for measuring a transmission system, said apparatus comprising:

a first adjustable calibration line for generating a noise signal based on a noise source;

a level detector receiving the noise signal and a carrier signal via a toggle switch, wherein the first calibration line is controlled based on an output of the level detector so that a level of the noise signal is in a predetermined ratio with a level of the carrier signal; and a second adjustable calibration line for attenuating the noise signal and adjustable to the desired signal-to-noise ratio.

9. An apparatus according to claim 8, further comprising: the wanted signal (C) is generated by modulation of the carrier frequency of a local oscillator (LO) in a modulator (MO) and an inverse mixer (MI), supplied with the frequency of the local oscillator (LO), is arranged between the reversing switch (U) and the level detector (D).

10. An apparatus according to claim 8, further comprising a fixed frequency band filter coupled before the level detector, said band filter having a bandwidth (B) equal to or smaller than a smallest signal bandwidth of the transmission system.

* * * * *